US008593469B2

(12) United States Patent
Sriram et al.

(10) Patent No.: US 8,593,469 B2
(45) Date of Patent: Nov. 26, 2013

(54) METHOD AND CIRCUIT FOR EFFICIENT CACHING OF REFERENCE VIDEO DATA

(75) Inventors: Parthasarathy Sriram, Los Altos, CA (US); Han Chou, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 680 days.

(21) Appl. No.: 11/391,861

(22) Filed: Mar. 29, 2006

(65) Prior Publication Data

US 2007/0237231 A1 Oct. 11, 2007

(51) Int. Cl.
*G06T 15/00* (2011.01)
(52) U.S. Cl.
USPC ....... 345/531; 375/240.25; 711/170; 715/700
(58) Field of Classification Search
USPC ............. 345/531, 419; 711/170, 175; 715/61; 375/240.25
See application file for complete search history.

(56) References Cited

U.S. PATENT DOCUMENTS

| | | | |
|---|---|---|---|
| 5,585,931 A | 12/1996 | Juri et al. | |
| 5,714,950 A | 2/1998 | Jeong et al. | |
| 5,742,342 A | 4/1998 | Jung | |
| 5,751,232 A | 5/1998 | Inoue et al. | |
| 5,818,529 A | 10/1998 | Asamura et al. | |
| 5,831,557 A | 11/1998 | Handley | |
| 5,831,616 A * | 11/1998 | Lee .............................. | 715/861 |
| 5,848,194 A | 12/1998 | Ishizuka et al. | |

(Continued)

FOREIGN PATENT DOCUMENTS

| | | |
|---|---|---|
| CN | 101017574 A | 8/2007 |
| EP | 0463721 | 4/1991 |

(Continued)

OTHER PUBLICATIONS

Touimi et al.; "Efficient Conversion Method Between Subband Domain Representations", Jul. 2005, Speech and Sound Technologies and Processing Lab, France Telecom Research and Development.

(Continued)

*Primary Examiner* — Phu K Nguyen (57) ABSTRACT

In some embodiments, a video processing system including video processor, an external memory, and an integrated circuit that implements both a memory controller (having embedded intelligence) and an internal memory coupled to the memory controller. The memory controller is configured to pre-cache in the internal memory partial frames of reference video data in the external memory (e.g., N-line slices of M-line reference frames, where M>N), and to respond to requests (e.g., from the video processor) for blocks of reference video data including by determining whether each requested block (or each of at least two portions thereof) has been pre-cached in the internal memory, causing each requested cached block (or portion thereof) to be read from the internal memory, and causing each requested non-cached block (or portion thereof) to be read from the external memory. Preferably, the pre-caching is performed in a predetermined manner independent of which read requests for the reference data are actually asserted, and exploits known correlation between two-dimensional pixel locality of each block ("current block") of data to undergo processing (e.g., decoding) using reference data, two-dimensional pixel locality of each block of reference data that may be requested to process the current block, and probability that each such reference data block will be needed to process the current block. Other aspects are memory controllers for use in such a system and methods performed during operation of any such system or memory controller.

62 Claims, 3 Drawing Sheets

(56) References Cited

U.S. PATENT DOCUMENTS

| | | | |
|---|---|---|---|
| 5,883,671 A | 3/1999 | Keng et al. |
| 5,883,823 A | 3/1999 | Ding |
| 5,990,812 A | 11/1999 | Bakhmutsky |
| 6,008,745 A | 12/1999 | Zandi et al. |
| 6,009,203 A | 12/1999 | Liu et al. |
| 6,041,403 A | 3/2000 | Parker et al. |
| 6,047,357 A | 4/2000 | Bannon et al. |
| 6,072,548 A | 6/2000 | Schoner et al. |
| 6,081,783 A | 6/2000 | Divine et al. |
| 6,151,359 A | 11/2000 | Acer et al. |
| 6,157,396 A | 12/2000 | Margulis et al. |
| 6,198,773 B1 | 3/2001 | Gill et al. |
| 6,222,467 B1 | 4/2001 | Moon |
| 6,259,741 B1 | 7/2001 | Chen et al. |
| 6,426,975 B1 | 7/2002 | Nishi et al. |
| 6,442,206 B1 | 8/2002 | Hrusecky |
| 6,456,340 B1 | 9/2002 | Margulis |
| 6,459,738 B1 | 10/2002 | Wu et al. |
| 6,504,496 B1 | 1/2003 | Mesarovic et al. |
| 6,535,642 B1 | 3/2003 | De Bonet |
| 6,543,023 B2 | 4/2003 | Bessios |
| 6,546,145 B1 | 4/2003 | Miyake et al. |
| 6,587,057 B2 | 7/2003 | Scheuermann |
| 6,618,440 B1 | 9/2003 | Taunton |
| 6,647,061 B1 | 11/2003 | Panusopone et al. |
| 6,675,282 B2 | 1/2004 | Hum et al. |
| 6,738,884 B1 * | 5/2004 | Greicar ......... 711/173 |
| 6,775,414 B1 | 8/2004 | Fogg et al. |
| 6,799,192 B1 | 9/2004 | Handley |
| 6,839,624 B1 | 1/2005 | Beesley et al. |
| 6,903,669 B1 | 6/2005 | Subramaniam |
| 6,992,605 B2 | 1/2006 | Kadono et al. |
| 7,046,175 B1 | 5/2006 | Subramaniam |
| 7,095,344 B2 | 8/2006 | Sekiguchi et al. |
| 7,095,896 B2 | 8/2006 | Abe et al. |
| 7,100,017 B2 * | 8/2006 | Greicar ......... 711/173 |
| 7,109,898 B2 | 9/2006 | Kadono et al. |
| 7,113,115 B2 | 9/2006 | Partiwala et al. |
| 7,129,862 B1 | 10/2006 | Shirdhonkar et al. |
| 7,132,963 B2 | 11/2006 | Pearlstein et al. |
| 7,161,508 B2 | 1/2007 | Kadono et al. |
| 7,283,589 B2 | 10/2007 | Cai et al. |
| 7,286,066 B1 | 10/2007 | Ho et al. |
| 7,289,047 B2 | 10/2007 | Nagori |
| 7,324,026 B2 | 1/2008 | Puri et al. |
| 7,348,902 B2 | 3/2008 | Pisarevsky et al. |
| 7,366,240 B2 | 4/2008 | Chiang Wei Yin et al. |
| 7,372,378 B2 | 5/2008 | Sriram |
| 7,372,379 B1 | 5/2008 | Jia et al. |
| 7,404,645 B2 | 7/2008 | Margulis |
| 7,447,266 B2 * | 11/2008 | Yamashita et al. ....... 375/240.25 |
| 7,480,418 B2 | 1/2009 | Niemi et al. |
| 7,496,234 B2 | 2/2009 | Li |
| 7,538,783 B2 * | 5/2009 | MacInnis et al. ........... 345/660 |
| 7,598,962 B2 * | 10/2009 | MacInnis et al. ........... 345/589 |
| 7,605,725 B2 | 10/2009 | Puri et al. |
| 7,660,352 B2 | 2/2010 | Yamane et al. |
| 7,681,013 B1 | 3/2010 | Trivedi et al. |
| 7,884,742 B2 | 2/2011 | Puri et al. |
| 2001/0030615 A1 | 10/2001 | Zhou |
| 2002/0063807 A1 | 5/2002 | Margulis |
| 2002/0181794 A1 | 12/2002 | Lee |
| 2003/0014241 A1 | 1/2003 | Ferris et al. |
| 2003/0078952 A1 | 4/2003 | Kim et al. |
| 2003/0079222 A1 | 4/2003 | Boykin et al. |
| 2004/0057522 A1 | 3/2004 | Wu et al. |
| 2004/0081245 A1 | 4/2004 | Deeley et al. |
| 2004/0158719 A1 | 8/2004 | Lee et al. |
| 2004/0264565 A1 | 12/2004 | MacInnis |
| 2005/0015248 A1 | 1/2005 | Kadono et al. |
| 2005/0018796 A1 | 1/2005 | Sande et al. |
| 2005/0033788 A1 | 2/2005 | Handley |
| 2005/0117056 A1 | 6/2005 | Aprea et al. |
| 2005/0229231 A1 | 10/2005 | Lippincott |
| 2005/0254583 A1 | 11/2005 | Kim et al. |
| 2006/0002475 A1 | 1/2006 | Fuchs |
| 2006/0023789 A1 | 2/2006 | Yamashita et al. |
| 2006/0064560 A1 | 3/2006 | Mizuno et al. |
| 2006/0067582 A1 | 3/2006 | Bi et al. |
| 2006/0071829 A1 | 4/2006 | Pearlstein et al. |
| 2006/0176960 A1 | 8/2006 | Lu et al. |
| 2007/0061522 A1 | 3/2007 | Vink |
| 2007/0065027 A1 | 3/2007 | Boon et al. |
| 2007/0126608 A1 | 6/2007 | Sriram |
| 2008/0005736 A1 | 1/2008 | Apacible et al. |
| 2008/0218387 A1 | 9/2008 | Chang et al. |
| 2009/0103824 A1 | 4/2009 | Niemi et al. |
| 2009/0196356 A1 | 8/2009 | Houki |
| 2009/0198753 A1 | 8/2009 | Benjelloun Touimi |

FOREIGN PATENT DOCUMENTS

| | | |
|---|---|---|
| EP | 0971546 | 4/1999 |
| JP | 11099638 | 4/1999 |
| TW | 200428879 | 11/2009 |
| TW | 200520535 | 12/2009 |
| WO | 2004102971 | 11/2004 |
| WO | 2006008961 A1 | 1/2006 |
| WO | 2006008961 A1 | 8/2011 |

OTHER PUBLICATIONS

Madisetti, Vijay K., "The Digital Signal Processing Handbook", CRC Press LLC, 1998, Chapters 37 and 40, pp. 37-2, 37-3, 37-4, 40-6, 40-10, 40-12, 40-13, 40-15, 40-16.

ARM, "ARM926EJ-S Jazelle Enhanced Macrocell", May 19, 2006, http://www.arm.com/products/CPUs/ARM926EJ-S.html.

Lee, W., et al., "MPEG-2 Decoder Implementation on MAP-1000A Media Processor Using the C Language," Proc. SPIE: Media Processors 2000, International Soc. For Optical Engineering (Bellingham, Washington), p. 27-36.

Nikara, J., et al., "Parallel Multiple-Symbol Variable-Length Decoding," Pro. Of 2002 IEEE Intl Conf on Comp. Design: VLSI in Comp Processors, IEEE, p. 1-6, (May 19, 2002).

Rohini Krishnan; et al., "Design of a 2D DCT/IDCT Application Specific VLIW Processor Supporting Scaled and Sub-sampled Blocks," 16th International Conference on VLSI Design, 2003, Six Pages.

Texas Instruments, "TMS320C6411 Fixed Point Digital Signal Processor Datasheet", May 19, 2006, http://focus.ti.com/docs/prod/folders/print/tms320c6411.html.

The Moving Picture Experts (MPEG), "MPEG Standards", May 19, 2006, http://www.chiariglione.org/mpeg/standards.htm.

Miska Hanniksela, Picture Decoding Method, USPTO Provisional Application filed Feb. 18, 2003; U.S. Appl. No. 60/448,189.

Ting-Kun Yeh et al., Video Decoder, USPTO Provisional Application filed Dec. 3, 2003; U.S. Appl. No. 60/526,294.

English Translation of Office Action for Chinese Patent Application No. 200810212373.X, Entitled: Decoding Variable Length Codes in JPEG Applications.

* cited by examiner

METHOD AND CIRCUIT FOR EFFICIENT CACHING OF REFERENCE VIDEO DATA

FIELD OF THE INVENTION

The invention pertains to methods and circuitry for caching video data (e.g., during decoding or other processing of the video data by a multimedia processor in the presence of on-chip memory).

BACKGROUND OF THE INVENTION

Throughout the disclosure, the term "block" of video data is used to denote a subset of the data comprising a frame of video data having spatial location within a rectangular region the frame. A block of video data can but need not consist of compressed (or otherwise encoded) video data. Examples of blocks of video data are the conventionally defined macroblocks of MPEG-encoded video frames.

Conventional media processors often cache video data during decoding or other processing, but are typically highly inefficient in several ways including in that the data cache hit rate is low, power consumption and costs are high, and performance is low. Even with the availability of huge on-chip RAM, it may not be feasible to cache all the necessary data on the chip on which the processor is implemented. As a result, most current media processor designs do not use caches for referencing pixel data.

In one type of conventional video decoding, a Motion Compensation Unit (MCU) generates decoded video data from encoded (compressed) frames and reference frames of encoded video. In typical operation, an MCU consumes much data bandwidth. Most of the memory accesses triggered by an MCU during decoding operation are for the purpose of bringing in two-dimensional pixel blocks needed for computations. These accesses are typically very expensive for several critical reasons, including the following: (1) most of the reference pixel data (pixels of reference frames) are in external SDRAM (SDRAM external to the chip in which the MCU is implemented) and hence, accessing such data consumes much power; (2) two-dimensional blocks of reference pixel data are needed at any pixel boundary, and due to restrictions on operation of SDRAM and memory controllers for controlling accesses to SDRAM, the actual pixel bandwidth is higher than the data actually requested by the MCU; and (3) latency to bring data into an MCU from external SDRAM is also high and hence, accesses to the external SDRAM result in performance loss. To overcome these issues, it has become a standard practice to include huge amounts of on-chip RAM in integrated circuits that implement video decoding. By providing a sufficient amount of internal storage (on-chip RAM or "IRAM") for reference pixel data, it is possible to reduce bandwidth for accesses from external memory (e.g., an external SDRAM) and to reduce power consumption.

It has been proposed to cache video data (from external RAM) in on-chip memory during decoding or other processing. For example, U.S. Patent Application Publication No. 2004/0264565, published Dec. 30, 2004, discloses caching of video data blocks (that have previously been read from a DRAM) in a cache memory organized into tag blocks, with dynamic tracking of pixel addresses. However, this caching technique consumes undesirably large amounts of power in typical applications, since maintaining each tag RAM and performing address comparisons (i.e., comparing requested data addresses with tag block address ranges in response to each read request for a block of data) consumes much power (the calculations and address mapping need to be made on every block transaction).

U.S. Pat. No. 6,618,440, issued on Sep. 9, 2003, U.S. Patent Application Publication No. 2006/0002475, published on Jan. 5, 2006, and U.S. Patent Application Publication No. 2006/0023789, published on Feb. 2, 2006, also disclose caching of video data from external RAM during decoding or other processing.

Even with a large amount of on-chip RAM ("IRAM") available for caching reference pixel data, it may not be practical to store complete reference frames in such IRAM. For example, many encoding schemes (e.g., MPEG-2) require that an MCU employ two reference frames during operation, and since a single reference frame at 720×480 resolution would consume 720×480*1.5 bytes=518 Kbytes, caching the large amount of data comprising two reference frames is typically not practical. IRAM memory requirements for caching are strongly dependent on the resolution and format of the video being decoded. As a result, most conventional caching schemes do not cache reference data in IRAM when the resolution of the video data undergoing processing is greater than a certain limit (e.g., 352×288 pixels).

Figure 1:
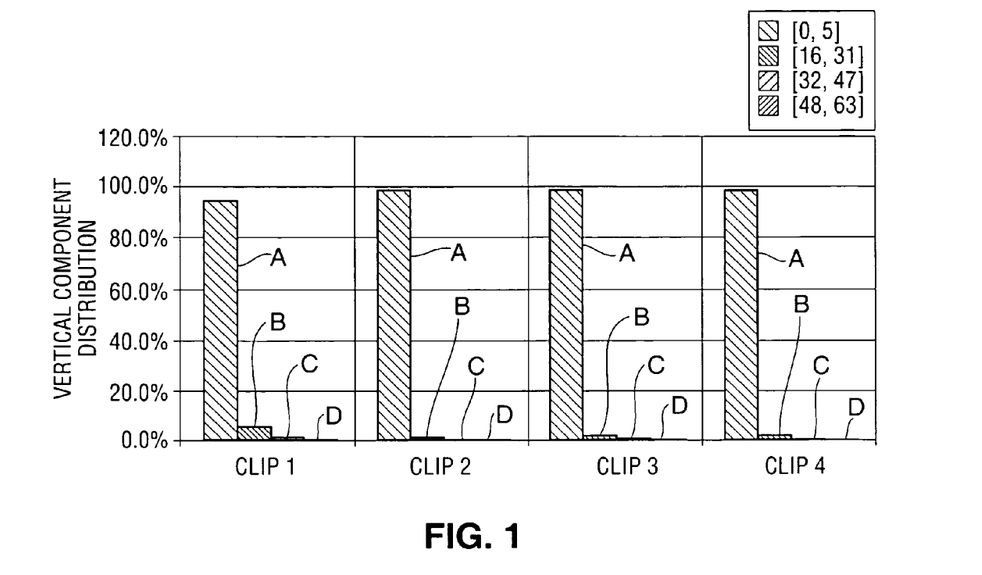
FIG. 1 is a histogram indicating the vertical range of reference data blocks requested by a motion compensation unit (MCU) during decoding of MPEG-2-encoded video streams from four different movies.

Having analyzed motion vectors associated with typical video content, the present inventors have recognized that caching of partial reference frames can be effectively used to minimize bandwidth for accesses to external memory during video decoding. FIG. 1 shows the vertical range of reference data requested by an MCU during decoding of MPEG-2-encoded video streams from four different movies. In FIG. 1, bars "A" represent requested blocks of data in lines of a reference frame corresponding to those within a vertical range of 15 pixels of the lines (of the current frame being decoded) containing the current macroblock undergoing decoding (i.e., blocks consisting of data in lines of the reference frame vertically separated by not more than 15 lines from the "current macroblock lines"), bars "B" represent requested blocks (other than those in bars "A") consisting of data in lines of a reference frame within a vertical range of 31 pixels of the current macroblock lines, bars "C" represent requested blocks (other than those in bars "A" and "B") consisting of data in lines of a reference frame within a vertical range of 47 pixels of the current macroblock lines, and bars "D" represent requested blocks (other than those in bars "A," "B," and "C") consisting of data in lines of a reference frame within a vertical range of 63 pixels of the current macroblock lines. Consistent with FIG. 1, the inventors have recognized that most (typically more than 90%) of the blocks of reference data requested during typical video decoding are contained in lines of a reference frame that are vertically separated by not more than 16 pixels from the current macroblock lines. Thus, a class of preferred embodiments of the present invention perform on-chip pre-caching of lines (of reference frames) that are vertically separated by not more than 16 pixels from the current macroblock lines, to minimize accesses during video decoding to external memory (e.g., an external SDRAM) in which each reference frame is stored.

The inventors have recognized that caching of partial reference frames also presents its own set of problems. For example, if a two-dimensional region of a reference frame is cached in IRAM, and an MCU requests data from this cached region, the data can be sent directly from the cache memory without any access to external SDRAM. However, if the MCU requests a block of reference data that is only partially cached (e.g., a boundary block), fulfilling the request is inherently complicated and requires accessing of at least some requested data from external memory.

The present invention accomplishes efficient caching (in IRAM) of reference data needed to perform video decoding (or other processing) by pre-caching of partial reference frames. Some preferred embodiments of the invention accomplish efficient on-chip pre-caching of partial reference frames, and efficient handling of requests from a video processor for reference data, in a manner that is conveniently programmable (e.g., in firmware).

SUMMARY OF THE INVENTION

In a class of embodiments, the inventive video processing system includes video processor, an external memory, and an integrated circuit that implements both a memory controller (having embedded intelligence) and an internal memory (e.g., SRAM in preferred embodiments) coupled to the memory controller. The video processor is coupled to the memory controller. The video processor and internal memory are typically elements of the same integrated circuit, but the external memory is not an element of such integrated circuit. The memory controller is configured to pre-cache partial frames of reference video data in the internal memory (e.g., N-line slices of M-line reference frames, where M>N), preferably by DMA transfers from the external memory to the internal memory, and to respond to requests (e.g., from the video processor) for blocks of reference video data including by determining whether each requested block (or each of at least two portions thereof) has been pre-cached in the internal memory, causing each requested cached block (or portion thereof) to be read from the internal memory, and causing each requested non-cached block (or portion thereof) to be read from the external memory. In preferred embodiments, the memory controller responds to each read request for a reference data block in such a manner that the video processor does not know whether the requested block is read from the external memory (which may be external SDRAM) or internal memory, or whether part of the requested block has been read from the internal memory and the rest from the external memory.

Preferably, the inventive system is programmable (e.g. with firmware) or pre-configurable to perform a sequence of pre-caches of reference data in a predetermined manner independent of which read requests for the reference data are actually asserted. For example, a memory controller of the system may be programmed with firmware to pre-cache a sequence of predetermined N-line subsets (slices) of each M-line reference frame (where M>N), each such pre-caching operation to be performed at an appropriate predetermined time (e.g., so that each slice is pre-cached just before the start of processing of a sequence of current blocks likely to require reference data included in the cached slice, and so that each slice remains cached throughout the entire duration of processing of such sequence of current blocks). Performing pre-caching in this way avoids the need for hardware associated with typical L2 caches.

Pre-caching in accordance with preferred embodiments of the invention exploits known correlation between the two-dimensional pixel locality of each block ("current block") of data to undergo processing (e.g., decoding) in a video processor using reference data, the two-dimensional pixel locality of each block of reference data that may be requested by the video processor to process the current block, and the likelihood that each such reference data block will be needed to process the current block. In preferred embodiments of the inventive system, before a current block undergoes processing in a video processor, the system pre-caches reference data having a high probability (based on video processing principles that correlate two-dimensional pixel localities of the current block and of blocks of the reference data with the likelihood that each such reference data block will be needed to process the current block) of being needed to process the current block. For example, a memory controller of the system may exploit a known correlation between the two-dimensional pixel localities of each current block and of reference data blocks of a reference frame (or of each of two or more reference frames) that may be used to process the current block, and the likelihood that each such reference data block will be needed to process the current block, by pre-caching in internal memory only a portion of each relevant reference frame that includes reference data having a probability exceeding a predetermined threshold of being needed for processing the current block.

Also, the memory controller is preferably configured to respond to read requests for reference data blocks by determining, without comparing any full address associated with a requested block with any full address of cached reference data, whether each requested block has been pre-cached. For example, the memory controller's configuration can be updated each time reference data is pre-cached in internal memory to give the memory controller knowledge of the spatial location (with respect to a reference frame) of the pre-cached reference data, and the memory controller can then respond to each request for reference data by comparing the spatial location of the requested data (with respect to the reference frame) with the spatial location (within the reference frame) of the pre-cached data to determine, without comparing any full address associated with the requested data with any full address of cached reference data, whether the requested data resides in the cache memory.

For a more specific example, if each current block has size P×P pixels, with P≤16, a preferred embodiment of the inventive system is operable in a mode (e.g., a high resolution operating mode) in which it pre-caches a sequence of 48-line slices of a reference frame or of each of two or more reference frames (each slice for use in processing a sequence of current blocks). Each slice includes data likely to be needed for processing a current block and consists of 16 reference frame lines ("current block lines") that correspond to (i.e., match or include) the vertical position range of each current block to be processed while the slice remains cached, 16 lines of the reference frame immediately above the current block lines, and 16 lines of the reference frame immediately below the current block lines. The memory controller's configuration is updated each time reference data is pre-cached to give the memory controller knowledge of the spatial location (within the relevant reference frame) of the pre-cached reference data. During operation in the mode (e.g., the high resolution operating mode) after pre-caching, the memory controller responds to each request for reference data from a reference frame by comparing the spatial location of the requested data (with respect to the reference frame) with the spatial location (within the reference frame) of the pre-cached slice to determine (without comparing any full address associated with the requested data with any full address of cached reference data) whether the requested data resides in cache memory. Preferably, the system is also operable in another mode (e.g., a low resolution operating mode) in which the memory controller pre-caches entire frames (rather than partial frames) of reference data.

In preferred embodiments, the memory controller of the inventive system does not perform dynamic address manipulations or tracking in response to requests for reference data blocks. Rather, the memory controller's configuration is updated each time reference data is pre-cached in internal memory to give the memory controller knowledge of the spatial location (within the relevant reference frame) of the pre-cached reference data, and the memory controller then responds to each request for a block of a reference frame by comparing the spatial location of the requested block (with respect to the reference frame), or of each of at least two portions ("chunks") of the requested block, with the spatial location (within the reference frame) of the pre-cached data to determine (without comparing any full address associated with the requested block with any full address of pre-cached data) whether the requested block (or portion thereof) resides in the cache memory and thus should be retrieved from internal memory, or whether the requested block (or portion thereof) has not been pre-cached and thus should be retrieved from external memory. Full address comparison can be avoided, for example, if the memory controller is configured to determine whether the vertical location of a requested block of a reference frame (as determined by a portion of the requested block's address) is within a vertical location range (with respect to the reference frame) associated with the pre-cached data. The vertical location range associated with the pre-cached data may be determined by memory controller configuration bits that indicate that pixels in a range of horizontal lines (e.g., lines "i" through "j," where i and j are integers) of the reference frame are pre-cached.

In some preferred embodiments, a memory controller is configured to pre-cache reference data in any of at least two different internal memories of the inventive system (or in any two or more of such internal memories) and to respond to requests from a video processor for blocks of reference data in a manner that appears to the video processor to be independent of the location(s) of the pre-cached data. For example, in some such embodiments, the memory controller is configured to pre-cache reference data in any one or more of: one or more IRAM units coupled (e.g., by a crossbar) to the video processor and the system's CPU but not directly coupled to the memory controller; block RAM directly coupled to the memory controller; and video cache memory.

In typical embodiments, the inventive system pre-caches reference data and responds to requests from a video processor for blocks of reference data in a manner consuming low power. The power required to perform these operations is preferably reduced by minimizing address lookups, avoiding LRU updates (updates of least recently used quantities), and pre-caching all reference data likely to be used (so as to reduce accesses to external memory to retrieve needed non-cached reference data).

In a class of embodiments, the invention is a method for video processing using a reference frame of video data in an external memory, including the steps of:

(a) pre-caching in an internal memory a sequence of partial frames of the reference frame, including by predetermining each of the partial frames in a manner independent of which reference data, if any, of the reference frame is actually requested for use in performing video processing; and (b) while one of the partial frames remains cached in the internal memory, asserting at least one request for reference data from the reference frame and responding to the request, including by determining whether at least some of the reference data indicated by said request is cached in the internal memory. Typically, step (b) includes the steps of causing pre-cached reference data identified by the request to be read from the internal memory and causing non-cached reference data identified by the request to be read from the external memory.

In preferred embodiments in this class, each request asserted in step (b) is for a reference data block of the reference frame. In some such preferred embodiments, step (b) includes the steps of: determining whether each of at least two portions (e.g., chunks) of the reference data block has been pre-cached in the internal memory, causing each pre-cached portion of the reference data block to be read from the internal memory, and causing each other portion of the reference data block to be read from the external memory. In preferred embodiments in this class, the reference frame is an M-line reference frame, step (a) includes the step of pre-caching in the internal memory a sequence of predetermined N-line subsets (slices) of the M-line reference frame, where M>N (e.g., by DMA transfers from the external memory). Preferably, each of the predetermined N-line subsets includes data likely to be needed for processing a sequence of current blocks of data, and each of the predetermined N-line subsets including data likely to be needed for processing a sequence of current blocks of data is pre-cached before processing of any of the current blocks in the sequence and remains cached in the internal memory during processing of said sequence of current blocks.

In another class of embodiments, the invention is a method for video processing using a reference frame of video data in an external memory, said method including the steps of:

(a) pre-caching in an internal memory a sequence of partial frames of the reference frame, in a manner exploiting correlation between two-dimensional pixel locality with respect to the reference frame of each of a sequence of current blocks of data, two-dimensional pixel locality of each of a number of reference data blocks of the reference frame that may be requested to process one of the current blocks, and probability that each of the reference data blocks will be needed to process each of the current blocks; and (b) while one of the partial frames remains cached in the internal memory, asserting at least one request for reference data from the reference frame and responding to the request, including by determining whether at least some of the reference data indicated by said request is cached in the internal memory. Typically, step (b) includes the steps of causing pre-cached reference data identified by the request to be read from the internal memory and causing non-cached reference data identified by the request to be read from the external memory.

In some embodiments in this class, step (a) is performed such that each of the partial frames includes all reference data having a probability, that exceeds a predetermined threshold, of being needed to process each current block in a different subsequence of the sequence of current blocks.

In another class of embodiments, the invention is a method for video processing using a reference frame of video data in an external memory, said method including the steps of:

(a) pre-caching in an internal memory a sequence of partial frames of the reference frame; and (b) while one of the partial frames remains cached in the internal memory, asserting at least one request for reference data from the reference frame and responding to the request, including by determining whether at least some of the reference data indicated by said request is cached in the internal memory without performing any full address comparison. Typically also, step (b) includes the step of causing pre-cached reference data identified by the request to be read from the internal memory. Full address comparison can be avoided, for example, by determining whether vertical location of a requested block of the reference frame (as determined by a portion of the requested block's address) is within a vertical location range (with respect to the reference frame) associated with said one of the partial frames in the internal memory. The vertical range associated with said one of the partial frames in the internal memory may be determined by memory controller configuration bits that indicate that pixels in a range of horizontal lines (e.g., lines "i" through "j," where i and j are integers) of the reference frame are cached in the internal memory.

In another class of embodiments, the invention is a method for video processing using a reference frame of video data in an external memory, said method including the steps of:

(a) pre-caching in an internal memory a sequence of partial frames of the reference frame; and (b) while one of the partial frames remains cached in the internal memory, asserting requests for reference data from the reference frame, and responding to the requests without performing dynamic address manipulations and including by determining whether at least some of the reference data indicated by each of the requests is cached in the internal memory. Typically also, step (b) includes the step of causing pre-cached reference data identified by the request to be read from the internal memory.

In some embodiments in each class described in each of the two previous paragraphs, each request is for a reference data block, and step (b) includes the steps of responding to the request by comparing spatial location of the requested reference data block (with respect to the reference frame), or of each of at least two portions ("chunks") of the requested block, with the spatial location (with respect to the reference frame) of said one of the partial frames to determine whether the requested reference data block (or portion thereof) resides in the internal memory and thus should be retrieved from internal memory, or whether the requested reference data block (or portion thereof) is not cached and thus should be retrieved from the external memory.

Some embodiments in each class described in each of the three previous paragraphs employ a memory controller (having an updatable configuration) coupled to the internal memory and the external memory, and include the step of: upon pre-caching each of the partial frames, configuring the memory controller with configuration data indicative of spatial location, with respect to the reference frame, of said each of the partial frames. In these embodiments, step (b) includes the steps of: asserting each said request for reference data to the memory controller, and operating the memory controller to compare spatial location of the requested data with respect to the reference frame, with the spatial location with respect to the reference frame of said one of the partial frames. In some embodiments described in this paragraph, each request is for a reference data block having size P×P pixels, where P≤16, and each of the partial frames is a 48-line slice of the reference frame. Each slice includes data likely to be needed for processing at least one current block and consists of 16 reference frame lines ("current block lines") that correspond to (i.e., match or include) a vertical position range of each said current block, 16 lines of the reference frame immediately above the current block lines, and 16 lines of the reference frame immediately below the current block lines.

Other aspects of the invention are memory controllers (and integrated circuits including memory controllers) for use in any embodiment of the inventive system, and methods performed during operation of any embodiment of the inventive system or memory controller.

DETAILED DESCRIPTION OF PREFERRED EMBODIMENTS

Figure 2:
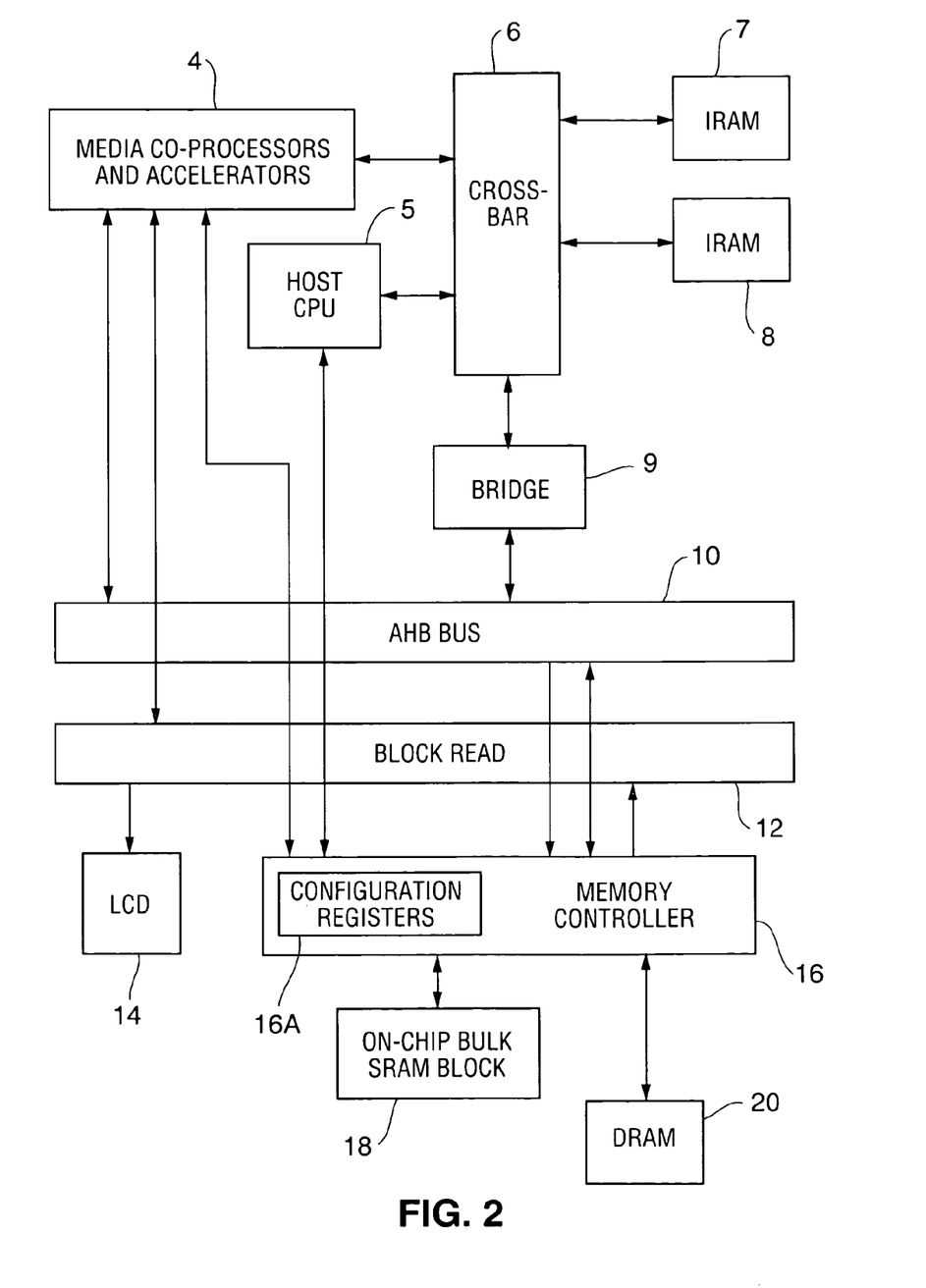
FIG. 2 is a block diagram of a processing system (having video decoding capability) that can be implemented in accordance with the invention.

A class of embodiments of the inventive system will be described with reference to FIG. 2. FIG. 2 is a block diagram of a processing system having video decoding capability that can be implemented in accordance with the invention. The FIG. 2 system can be a portable media player (or another portable data processing system or a data processing system not intended to be portable) and can include additional elements that are not shown in FIG. 2.

The FIG. 2 system includes host processor 5 (which functions as the system's CPU and typically includes cache memory), media co-processor and accelerator unit 4, on-chip RAM ("IRAM") units 7 and 8, crossbar 6 (coupled between elements 4, 5, 7, and 8), bus 10 (which can be implemented as an Advanced Microprocessor Bus Architecture High-performance Bus, or "AHB"), bus 12 (which can also be implemented as an AHB), bridge unit 9 (coupled between bus 10 and crossbar 6), RAM 18 (which is a bulk SRAM in a preferred implementation), external memory 20 (which is an SDRAM in a preferred implementation), and memory controller 16 (coupled to buses 10 and 12, directly to elements 4 and 5, and to RAM 18 and external memory 20), and LCD (liquid crystal display) 14 coupled to bus 12. RAM 18 is an internal (or "on-chip") memory in the sense that memory controller 16 and RAM 18 are implemented on a single integrated circuit ("chip"). RAM 20 is external to controller 16 in the sense that it is not implemented on the same chip as are RAM 18 and controller 16.

Media co-processor and accelerator unit ("video processor") 4 is configured to perform pipelined video decoding and typically other video data processing and audio data processing. Video processor 4 typically includes a motion compensation unit (coupled to bus 12 to receive encoded video data to be decoded), a pixel reconstruction unit coupled to receive the output of the motion compensation unit, and a deblocking unit coupled and configured to receive the output of the pixel reconstruction unit, to generate decoded video suitable for display in response thereto, and to assert the decoded video to bus 12 for display by LCD 14.

Data to be written to memory 18 or 20 (e.g., reference frames to be written to memory 20) can be asserted to bus 10, and from bus 10 to memory controller 16. Memory controller 16 can assert data read from memory 18 (and/or from memory 20) to bus 12, so that this data can be accessed from bus 12 by video processor 4 (and/or other elements coupled to bridge unit 9).

In preferred implementations of the FIG. 2 system, memory controller 16 is configured to be operable in at least two different modes:

at least one mode (e.g., a low resolution mode in which each frame of video data to be decoded consists of a relatively small amount of data) in which it pre-caches, in memory 18, full reference frames from external DRAM 20 by performing DMA (direct memory access) transfers from DRAM 20 to memory 18, and responds to read requests from video processor 4 for blocks of reference data that are very likely to be cached in memory 18, but may (in some cases) be stored in external DRAM 20 or partially cached in memory 18 and partially stored in external DRAM 20; and at least one other mode (e.g., a high resolution mode in which each frame of video data to be decoded consists of a relatively large amount of data) in which it pre-caches, in memory 18, partial reference frames (e.g., slices of reference frames, to be described below) from external DRAM 20 by performing DMA transfers from DRAM 20 to memory 18, and responds to read requests from video processor 4 for blocks of reference data that may be cached in memory 18, may be stored in external DRAM 20, or may be partially cached in memory 18 and partially stored in external DRAM 20. Preferably, in the latter modes when the current block is an M×M pixel block, the partial frames of reference data that are pre-cached in memory 18 are chosen so that they include the reference data having a high probability (a probability above a predetermined threshold) of being requested by video processor 4 for use in processing (e.g., decoding) each current block to be processed while the partial frame remains cached (e.g., M≤16, and each cached portion of a reference frame in DRAM 20 is a "slice" consisting of all horizontal lines of the reference frame that correspond to the horizontal lines of each block to be processed by processor 4 while the slice remains cached, and the 16 horizontal lines of the reference frame above these lines and the 16 horizontal lines of the reference frame below these lines).

In preferred implementations of the FIG. 2 system, memory controller 16 is configured to pre-cache either full or partial reference frames (and to respond to read requests for blocks of data that may or may not have been pre-cached) and is programmable in firmware to allow a system user to choose (and to program memory controller 16 to implement) an optimal caching strategy for any of several different conditions. By providing this level of caching intelligence to memory controller 16 in accordance with the invention, a video processor (e.g., video processor 4 or a motion compensation unit in video processor 4) can operate in a manner completely independent of the location of each requested pixel block, regardless of whether the requested block is in external memory (e.g., external DRAM 20), or cached in any of several different on-chip memories (e.g., in bulk RAM 18, IRAM 7, or IRAM 8), or cached on-chip in part and stored in external memory in part.

Pre-caching in accordance with preferred embodiments of the invention (e.g., preferred implementations of the FIG. 2 system) will be described with reference to reference frame 25 of FIG. 3. The description of FIG. 3 will assume that the reference data comprising frame 25 is stored in external DRAM 20, and that area "C" is the spatial location (with respect to reference frame 25) of a current block to be processed in video processor 4 using blocks of the reference data comprising frame 25.

In operation of preferred implementations of the FIG. 2 system, memory controller 16 periodically (e.g., initially, and then each time after a predetermined number of blocks of encoded video data have undergone decoding in video processor 4) caches in memory 18 a subset (a "slice," which typically consists of N full lines of a reference frame) of the pixels of a reference frame in DRAM 20 for use in subsequent processing of encoded data in video processor 4. Each slice should include blocks of pixels of the reference frame that are likely, based on video processing principles (correlating spatial addresses of blocks of pixels of the reference frame and of the "current blocks" that will undergo processing in processor 4 using pixels of the reference frame), to be needed to process current blocks in processor 4 while the slice remains cached in memory 18. An example of such a slice of frame 25 is area "S" which consists of a number of horizontal lines of frame 25's pixels. In typical embodiments in which each current block processed in processor 4 (e.g., a current block having spatial position "C" as shown in FIG. 3) consists of 16×16 pixels (or M×M pixels, with M≤16), each cached slice (e.g., slice "S") consists of 48 lines of frame 25's pixels. Each time memory controller 16 pre-caches such a 48-line slice, the slice consists of sixteen lines of the reference frame (to be referred to as "current block lines") that correspond to (i.e., match or include) the vertical position range of each current block to be processed in processor 4 while the slice remains cached, the sixteen lines of the reference frame immediately above the current block lines, and the sixteen lines of the reference frame immediately below the current block lines.

Preferably, memory controller 16 pre-caches each slice S in internal memory 18 by means of a DMA transfer of the relevant data from DRAM 20 to memory 18. Each time reference data (from a reference frame) is pre-cached in memory 18, the configuration of memory controller 16 is updated to give controller 16 knowledge of the spatial location (with respect to the reference frame) of the pre-cached pixels (e.g., the pixels of each pre-cached N-line slice "S"). For example, in some implementations, the configuration of memory controller 16 is updated to give controller 16 knowledge of the vertical location range of the pre-cached pixels with respect to the reference frame (e.g., the line numbers of the horizontal lines of the reference frame from which the pre-cached pixels have been written to memory 18). This configuration update can be accomplished by loading configuration registers 16A in memory controller 16 (e.g., configuration registers 31A in memory target derivation unit 31 of the FIG. 4 implementation of memory controller 16) with bits indicating the spatial location with respect to the relevant reference frame of the pre-cached reference data (e.g., partial addresses or other bits that indicate which horizontal lines of the reference frame have been cached, when a 48-line slice, or other N-line slice, of an M-line reference frame has been cached). When the described configuration update has been accomplished, configuration and pre-caching set up for memory controller 16 are complete.

When the configuration of memory controller 16 has been updated as described, memory controller 16 can respond to each request for a block of reference data from a reference frame by comparing the spatial location of the requested block with respect to the reference frame with the spatial location (with respect to the reference frame) of the pre-cached data (without comparing any full address associated with a requested block with any full address of cached reference data) to determine whether the requested block resides in internal memory 18. Full address comparison can be avoided, for example, when a pre-cached N-line slice (N full, horizontal lines) of an M-line reference frame (where N<M) resides in memory 18, by employing memory target derivation unit 31 (of the FIG. 4 implementation of memory controller 16) to determine whether the vertical location of a requested block of the reference frame (as determined by a portion of the requested block's address that has been asserted to unit 31 from block 30 of FIG. 4) is within the vertical location range with respect to the reference frame associated with the pre-cached slice. The vertical range associated with the pre-cached slice in internal memory 18 may be determined by configuration bits (that have been loaded into configuration registers 31A of unit 31, e.g., contemporaneously with the pre-caching of the slice in memory 18) indicating that pixels in a specific range of N horizontal lines (e.g., lines "i" through "j," where i and j are integers) of the reference frame are cached in memory 18.

Figure 4:
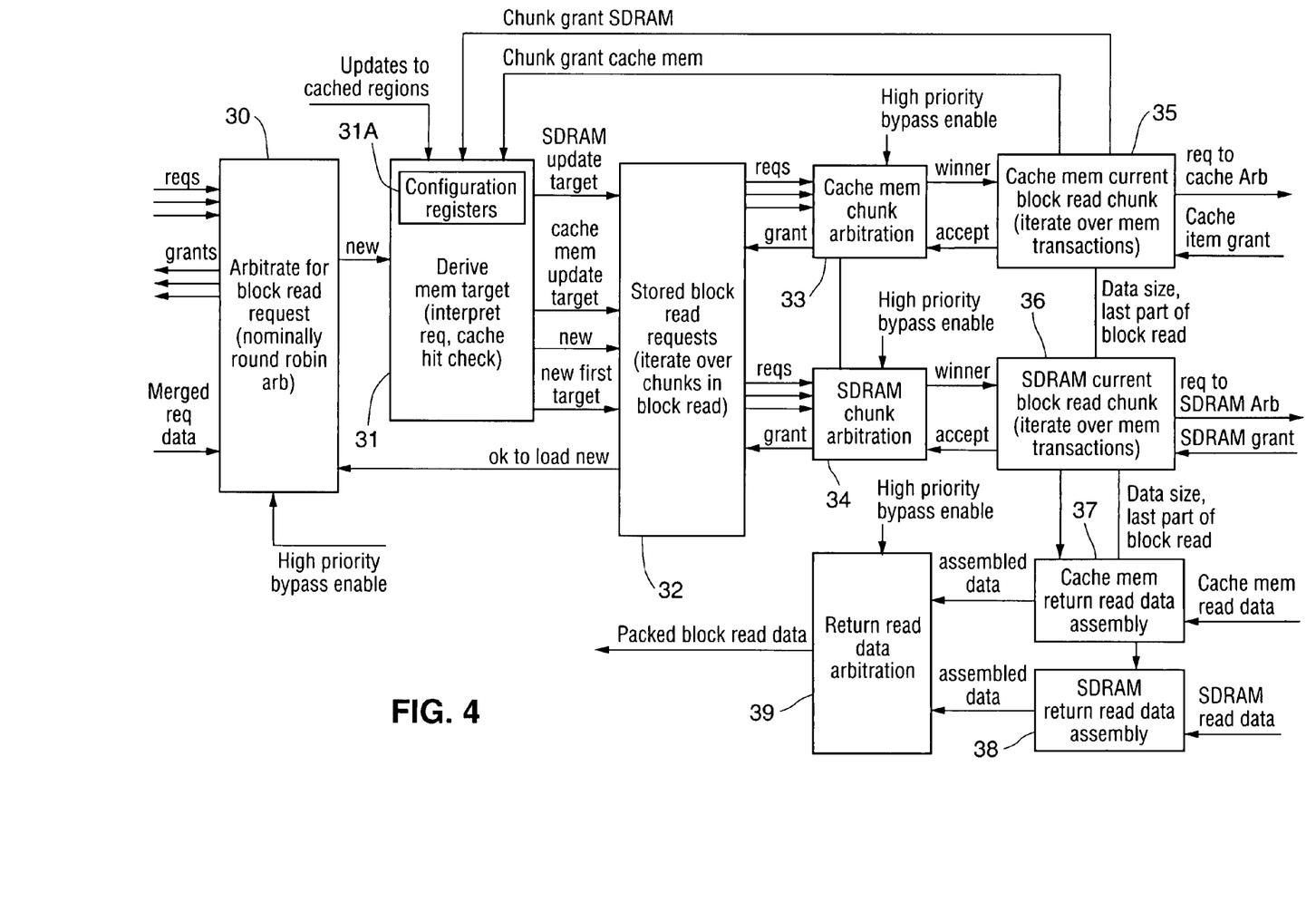
FIG. 4 is a block diagram of an implementation of elements of memory controller 16 of FIG. 2.

FIG. 4 is a block diagram of some elements of a pipelined implementation of memory controller 16 of FIG. 2. Other elements of this implementation of memory controller 16 (e.g., elements configured to perform pre-caching in accordance with the invention, in internal memory 18 or another memory, of a sequence of predetermined partial frames of a reference frame in external memory 20) are not shown in FIG. 4 for simplicity, since it will be apparent to those of ordinary skill in the art in view of the description herein how to implement such other elements. The elements shown in FIG. 4 are block read request arbitration unit 30, memory target derivation unit 31, chunk request generating unit 32, cache memory chunk arbitration unit 33, external memory chunk arbitration unit 34, cache memory interface 35, external memory interface 36, cache memory read data assembly unit 37, external memory read data assembly unit 38, and read data arbitration unit 39, coupled together as shown. In FIG. 4 and the description thereof, external memory 20 is sometimes referred to as an "SDRAM" since memory 20 is an SDRAM in typical implementations of the FIG. 2 system.

Block read request arbitration unit 30 is configured to respond to read requests (for blocks of reference data in external memory 20) from video processor 4 and/or from other elements of the FIG. 2 system. Typically, unit 30 implements round robin arbitration, is configured to assert a grant indication to the originator of each granted request, and is operable (in response to a high priority bypass enable signal) to give highest priority to requests from an originating unit that is identified as a high priority requestor by the high priority bypass enable signal.

Typically, each requested block of reference data consists of M×M pixels, where M=21, 16, 8, or 4, or some other small number. When M≤16, each partial frame of reference data pre-cached in memory 18 typically consists of 48 full lines of a reference frame. Since the FIG. 2 system may be operable in different operating modes, and since the size of reference data blocks may vary from mode to mode (and each reference block may be too large or small relative to the amount of data that can be efficiently read from memory 18 and/or 20 per memory access while allowing efficient system operation), unit 31 and the other elements of FIG. 4 preferably treat each request for a block of reference data as a request for N chunks of the requested block, each chunk having a suitable predetermined size. In typical implementations, the size of each chunk corresponds to not more than about four memory bursts, so that the memory controller can operate with the expectation that there will always be sufficient time to load the next block read request (i.e., since handling of the final chunk of a requested block causes no more than a few cycles of activity in the system, during which time no additional block read requests can make progress through the pipeline).

In an example of such a typical implementation, each requested block of reference data consists of M×M pixels, where M≤16, and each chunk has maximum size equal to about eight 32-bit words (each 32-bit word consisting of four, 8-bit pixels). In such a case, each requested block of reference data may be a 16×16 pixel block consisting of eight chunks (i.e., each requested reference data block consists of 256 pixels, with each pixel consisting of 8 bits, so that each such block consists of eight chunks, each chunk consisting of eight 32-bit words, each 32-bit word consisting of four, 8-bit pixels).

As mentioned above, memory target derivation unit 31 is preferably configured by bits loaded into registers 31A so that it can respond to each granted request for a reference data block by determining in an efficient manner (and without performing dynamic address manipulations or tracking, and without performing any full address comparison) whether each chunk of the block is fully cached in memory 18. Unit 31 can be so configured by loading appropriate configuration bits into registers 31A in response to bits labeled "updates to cached regions" in FIG. 4. The configuration bits in registers 31A determine the spatial location (e.g., vertical position range) with respect to the reference frame of the pixels of each cached partial frame (e.g., each N-line slice "S") in memory 18. When so configured, unit 31 responds to each granted request (identified as "new" in FIG. 4) for a reference data block by determining whether each chunk of the block is fully cached in memory 18.

In response to determining that a chunk of a requested block is cached in memory 18, unit 31 queues a cache memory access request and asserts the request (identified as "cache mem update target" in FIG. 4) to unit 32 at an appropriate time to cause unit 32 to initiate a read of the chunk from cache memory 18. More specifically, after asserting a predetermined number (Q) of cache memory access requests to unit 32 (e.g., in successive operating cycles), unit 31 asserts each subsequent cache memory access request to unit 32 only in response to each indication from unit 33 (by signal "chunk grant cache mem" asserted from unit 33) that a read request for a chunk of cached reference data has been asserted to cache memory interface 35. Such control of the timing of assertion of cache memory access requests from unit 31 to unit 32 is needed where the memory controller of FIG. 4 (i.e., elements 33 and 35 thereof) also handles requests for access to cache memory 18 other than those generated by unit 31 (e.g., requests for access to cache memory 18 asserted by other elements of the FIG. 2 system to unit 33 via unit 32) and unit 32 must queue all such access requests.

The memory controller of FIG. 4 services each read request for a cached chunk of reference data as a data transfer from cache memory 18 to the data requesting agent (e.g., to an MCU within video processor 4). Such transfers are performed instead of accesses to external memory and hence save power and bandwidth.

Figure 3:
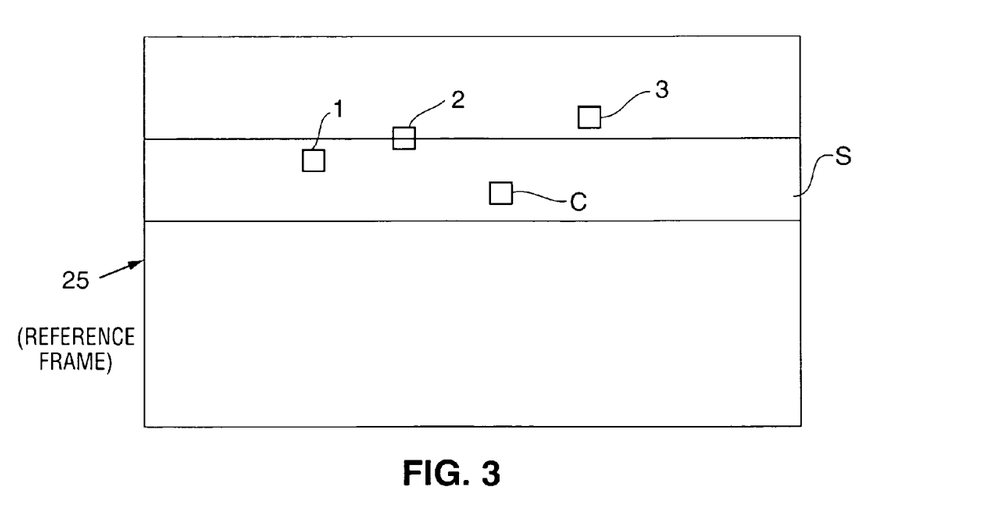
FIG. 3 is a diagram of a reference frame, showing a subset (slice S) of the pixels thereof that may be pre-cached in accordance with the invention, and blocks of pixels thereof (blocks 1, 2, and 3) that may be requested by a video processor for use in decoding one or more blocks of encoded video data.

An example of a cached block of reference data (consisting entirely of cached chunks) is identified as block 1 in FIG. 3. Block 2 of FIG. 3 is an example of a partially cached reference data block consisting of at least one cached chunk and at least one non-cached chunk. The memory controller of FIG. 4 treats each chunk that includes at least some non-cached data as a non-cached chunk.

Preferably, unit 31 is configured to respond to each reference data block request granted by unit 30 by identifying each chunk of the block that is not fully cached in memory 18. In response to determining that a chunk of a requested block includes data not cached in memory 18, unit 31 queues an external memory access request and asserts the request (identified as "SDRAM update target" in FIG. 4) to unit 34 at an appropriate time to cause unit 34 to initiate a read of the chunk from external memory 20. More specifically, after asserting a predetermined number (R) of external memory access requests to unit 32, unit 31 asserts each subsequent external memory access request to unit 32 only in response to an indication from unit 34 (by "chunk grant SDRAM" asserted from unit 34) that a read request for a chunk of non-cached reference data has been asserted to external memory interface 36. Such control of the timing of external memory access request assertions to unit 32 is needed where the memory controller of FIG. 4 (i.e., elements 34 and 36 thereof) also handles requests for access to external memory 20 other than those generated by unit 31 (e.g., requests for access to memory 20 asserted by other elements of the FIG. 2 system to unit 34 via unit 32) and unit 32 must queue all such access requests.

If unit 31 determines that a chunk of requested data is not fully cached in memory 18, the memory controller of FIG. 4 will trigger a read of the requested chunk directly from external memory 20. This will be a very low probability event if, as in preferred implementations, each slice of each reference data frame that is pre-cached in memory 18 is chosen such that all reference data of the frame most likely to be requested is pre-cached. Block 3 of FIG. 3 is an example of a non-cached block of reference data (consisting entirely of non-cached chunks).

If unit 31 determines that a requested block includes at least one cached chunk and at least one non-cached chunk, the memory controller of FIG. 4 triggers a read of each non-cached chunk from external memory 20 and a read of each cached chunk from memory 18. Cache memory read data assembly unit 37, external memory read data assembly unit 38, and read data arbitration unit 39 are configured to assemble the chunks read from memory 18 and/or from memory 20 into the requested block and provide the requested block to the requesting agent.

Units 31, 32, 37, 38, and 39 are preferably configured, in response to bits labeled "updates to cached regions" in FIG. 4, to know the mapping between the storage locations of DRAM 20 that contain the pixels of each pre-cached partial frame (e.g., each pre-cached slice S) and the storage locations of memory 18 in which these pixels are cached. If units 31, 32, 37, 38, and 39 are so configured, the FIG. 4 implementation of memory controller 16 can perform read accesses (including assembly of chunks read from memory and chunks read from memory 20 into requested blocks) very efficiently. Since only the non-cached chunk(s) of a requested reference block is (are) accessed from external memory, power and bandwidth consumption are reduced.

As described, unit 31 places each cache memory access request (for a cached chunk) into a queue and each external memory access request non-cache hit request (for a non-cached chunk) into another queue. The "chunk grant cache mem" and "chunk grant SDRAM" signals asserted to unit 31 from units 33 and 34 determine the rate at which processing of each queue progresses. Typically, the cache memory access request queue moves through the pipeline more quickly, so that unit 31 asserts cache memory access requests to unit 32 at a greater rate than it asserts external memory access requests to unit 32. Unit 32 typically receives requests for blocks of reference data from system elements other than unit 31 (as well as memory access requests from unit 31), and breaks each request for a reference data block from an element other than unit 31 for a reference data block into a sequence of requests for chunks of the reference data block. Unit 32 asserts all requests for chunks of cached data to cache memory chunk arbitration unit 33, and all requests for chunks of non-cached data to external memory chunk arbitration unit 34.

Unit 33 implements an arbitration procedure to grant one (identified as the "winner" in FIG. 4) of each set of competing cached data chunk requests and asserts each granted request to cache memory interface 35. In response, interface 35 asserts each such request to cache memory 18, receives a grant indication from memory 18 for each such request granted by memory 18, and asserts to cache memory read data assembly unit 37 indications of the identity and size of the latest chunk read from memory 18.

Unit 34 implements an arbitration procedure to grant one (identified as the "winner" in FIG. 4) of each set of competing data chunk requests and asserts each granted request to external memory interface 36. In response, interface 36 asserts each such request to external memory 20, receives a grant indication from memory 20 for each such request granted by memory 20, and asserts to external memory read data assembly unit 38 indications of the identity and size of the latest chunk read from memory 20.

Typically, units 33 and 34 assert grant indications to unit 32 identifying each granted request, and each of units 33 and 34 is operable (in response to a high priority bypass enable signal) to give highest priority to requests asserted thereto that are identified (by the high priority bypass enable signal) as requests from a high priority requester.

For each granted request for a block of reference data, cache memory read data assembly unit 37, external memory read data assembly unit 38, and read data arbitration unit 39 assemble the chunks read from memory 18 and/or memory 20 into the requested block, and provide the requested block to the requesting agent (e.g., by asserting the requested block to bus 12 for transfer to video processor 4).

Preferred embodiments of the inventive system implement circular addressing and/or multiple address translation to map external memory (e.g., external SDRAM 20) to cacheable IRAM memory (e.g., memory 7, 8, or 18). This is done to enable partial cacheable area updates for better power/bandwidth efficiencies.

Preferred embodiments of the inventive system are sufficiently configurable to adapt to multiple memory requirements and availability.

In a class of embodiments, the invention is a method for video processing using a reference frame of video data in an external memory, said method including the steps of:

(a) pre-caching in an internal memory (e.g., memory 18 of FIG. 2) a sequence of partial frames of the reference frame, including by predetermining each of the partial frames in a manner independent of which reference data, if any, of the reference frame is actually requested for use in performing video processing; and (b) while one of the partial frames remains cached in the internal memory, asserting at least one request for reference data from the reference frame and responding to the request, including by determining whether at least some of the reference data indicated by said request is cached in the internal memory. Memory controller 16, internal memory 18, and external memory 20 of FIG. 2 can perform step (a) of embodiments in this class, and video processor 4, memory controller 16, bus 12, and memories 18 and 20 of FIG. 2 can perform step (b) of such embodiments. Typically, step (b) also includes the steps of causing pre-cached reference data identified by the request to be read from the internal memory and causing non-cached reference data identified by the request to be read from the external memory.

In preferred embodiments in this class, each request asserted in step (b) is for a reference data block of the reference frame. In some such preferred embodiments, step (b) includes the steps of: determining (e.g., by operating unit 31 of FIG. 4 to determine) whether each of at least two portions (e.g., chunks) of the reference data block has been pre-cached in the internal memory, causing (e.g., by operating the FIG. 4 circuitry, with internal memory 18 and external memory 20 coupled thereto, to cause) each pre-cached portion of the reference data block to be read from the internal memory and each other portion of the reference data block to be read from the external memory. In preferred embodiments in this class, the reference frame is an M-line reference frame, step (a)

includes the step of pre-caching in the internal memory a sequence of predetermined N-line subsets (slices) of the M-line reference frame, where M>N (e.g., by DMA transfers from the external memory). Preferably, each of the predetermined N-line subsets includes data likely to be needed for processing a sequence of current blocks of data, and each of the predetermined N-line subsets including data likely to be needed for processing a sequence of current blocks of data is pre-cached before processing of any of the current blocks in the sequence and remains cached in the internal memory during processing of said sequence of current blocks.

In another class of embodiments, the invention is a method for video processing using a reference frame of video data in an external memory, said method including the steps of:

(a) pre-caching in an internal memory a sequence of partial frames of the reference frame, in a manner exploiting correlation between two-dimensional pixel locality with respect to the reference frame of each of a sequence of current blocks of data, two-dimensional pixel locality of each of a number of reference data blocks of the reference frame that may be requested to process one of the current blocks, and probability that each of the reference data blocks will be needed to process each of the current blocks; and (b) while one of the partial frames remains cached in the internal memory, asserting at least one request for reference data from the reference frame and responding to the request, including by determining whether at least some of the reference data indicated by said request is cached in the internal memory. Memory controller 16, internal memory 18, and external memory 20 of FIG. 2 can perform step (a) of embodiments in this class, and video processor 4, memory controller 16, bus 12, and memories 18 and 20 of FIG. 2 can perform step (b) of such embodiments. Typically, step (b) includes the steps of causing pre-cached reference data identified by the request to be read from the internal memory and causing non-cached reference data identified by the request to be read from the external memory.

In some embodiments in this class, step (a) is performed such that each of the partial frames includes all reference data having a probability, that exceeds a predetermined threshold, of being needed to process each current block in a different subsequence of the sequence of current blocks.

In another class of embodiments, the invention is a method for video processing using a reference frame of video data in an external memory, said method including the steps of:

(a) pre-caching in an internal memory a sequence of partial frames of the reference frame; and (b) while one of the partial frames remains cached in the internal memory, asserting at least one request for reference data from the reference frame and responding to the request, including by determining whether at least some of the reference data indicated by said request is cached in the internal memory without performing any full address comparison. Typically also, step (b) includes the step of causing pre-cached reference data identified by the request to be read from the internal memory. Memory controller 16, internal memory 18, and external memory 20 of FIG. 2 can perform step (a) of embodiments in this class, and video processor 4, memory controller 16, bus 12, and memories 18 and 20 of FIG. 2 can perform step (b) of such embodiments. Full address comparison can be avoided, for example, by determining (e.g., by operating unit 31 of FIG. 4 to determine) whether vertical location of a requested block of the reference frame (as determined by a portion of the requested block's address) is within a vertical location range (with respect to the reference frame) associated with said one of the partial frames in the internal memory. The vertical range associated with said one of the partial frames in the internal memory may be determined by memory controller configuration bits (e.g., configuration bits that have been loaded into registers 31A of unit 31 of FIG. 4) that indicate that pixels in a range of horizontal lines (e.g., lines "i" through "j," where i and j are integers) of the reference frame are cached in the internal memory.

In another class of embodiments, the invention is a method for video processing using a reference frame of video data in an external memory, said method including the steps of:

(a) pre-caching in an internal memory a sequence of partial frames of the reference frame; and (b) while one of the partial frames remains cached in the internal memory, asserting requests for reference data from the reference frame, and responding to the requests without performing dynamic address manipulations and including by determining whether at least some of the reference data indicated by each of the requests is cached in the internal memory. Typically also, step (b) includes the step of causing pre-cached reference data identified by the request to be read from the internal memory. Memory controller 16, internal memory 18, and external memory 20 of FIG. 2 can perform step (a) of embodiments in this class, and video processor 4, memory controller 16, bus 12, and memories 18 and 20 of FIG. 2 can perform step (b) of such embodiments.

In some embodiments in each class described in each of the two previous paragraphs, each request is for a reference data block, and step (b) includes the steps of responding to the request by comparing (e.g., by operating unit 31 of FIG. 4 to compare) spatial location of the requested reference data block (with respect to the reference frame), or of each of at least two portions ("chunks") of the requested block, with the spatial location (with respect to the reference frame) of said one of the partial frames to determine whether the requested reference data block (or portion thereof) resides in the internal memory and thus should be retrieved from internal memory, or whether the requested reference data block (or portion thereof) is not cached and thus should be retrieved from the external memory.

Some embodiments in each class described in each of the three previous paragraphs employ a memory controller having an updatable configuration (e.g., memory controller 16 of FIG. 2 or the memory controller of FIG. 4) coupled to the internal memory and the external memory, and include the step of: upon pre-caching each of the partial frames, configuring the memory controller with configuration data (e.g., loading configuration data into registers 31A of unit 31 of FIG. 4) indicative of spatial location, with respect to the reference frame, of said each of the partial frames. In these embodiments, step (b) includes the steps of: asserting each said request for reference data to the memory controller, and operating the memory controller to compare spatial location of the requested data with respect to the reference frame, with the spatial location with respect to the reference frame of said one of the partial frames. In some embodiments described in this paragraph, each request is for a reference data block having size P×P pixels, where P≤16, and each of the partial frames is a 48-line slice of the reference frame. Each slice includes data likely to be needed for processing at least one current block and consists of 16 reference frame lines ("current block lines") that correspond to (i.e., match or include) a vertical position range of each said current block, 16 lines of the reference frame immediately above the current block lines, and 16 lines of the reference frame immediately below the current block lines.

It should be understood that while some embodiments of the present invention are illustrated and described herein, the invention is defined by the claims and is not to be limited to the specific embodiments described and shown.

What is claimed is:

1. A method of video processing, said method comprising:
   storing, in a first memory, first data associated with a reference frame, wherein said first memory is included within an integrated circuit;
   responsive to said storing, updating a configuration of a memory controller;
   accessing a request for second data associated with the reference frame; and
   responsive to the request, determining whether said second data is stored in the first memory based on said configuration of said memory controller, and
   wherein said storing said first data is performed independently of said request.

2. The method of claim 1 further comprising:
   if said second data is stored in said first memory, accessing said second data from the first memory; and
   if said second data is not stored in said first memory, accessing said second data from a second memory, wherein said second memory is external to said integrated circuit.

3. The method of claim 1, wherein said second data comprises a portion of a reference data block of the reference frame.

4. The method of claim 1, wherein the reference frame is an M-line reference frame, wherein the first data comprises a plurality of predetermined N-line subsets of the M-line reference frame, wherein M is greater than N, wherein each of the plurality of predetermined N-line subsets includes data associated with processing of third data, and wherein each of the plurality of predetermined N-line subsets remains stored in the first memory during processing of said third data.

5. A method of video processing, said method comprising:
   determining first data associated with a reference frame, wherein said first data is further associated with processing of second data;
   storing, in a first memory, said first data;
   responsive to said storing, updating a configuration of a memory controller;
   accessing a request for third data associated with the reference frame; and
   responsive to the request, determining whether said third data is stored in the first memory based on said configuration of said memory controller, and
   wherein said storing said first data is performed independently of said request.

6. The method of claim 5 further comprising:
   if said third data is stored in said first memory, accessing said third data from the first memory: and
   if said third data is not stored in said first memory, accessing said third data from a second memory, wherein said second memory is external to said integrated circuit.

7. The method of claim 5, wherein said third data comprises a portion of a reference data block of the reference frame.

8. The method of claim 5, wherein the reference frame is an M-line reference frame, wherein the first data comprises a plurality of predetermined N-line subsets of the M-line reference frame, wherein M is greater than N, wherein each of the plurality of predetermined N-line subsets includes data associated with processing of fourth data, and wherein each of the plurality of predetermined N-line subsets remains stored in the first memory during processing of said fourth data.

9. The method of claim 5, wherein said determining further comprises determining said first data based upon information selected from a group consisting of: a probability associated with requiring said first data for processing of said second data; and a spatial relationship between said first data and said second data.

10. A method of video processing, said method comprising:
    storing, in a first memory, first data associated with a reference frame;
    responsive to said storing, updating a configuration of a memory controller;
    accessing a request for second data associated with the reference frame; and
    responsive to the request, determining whether said second data is stored in the first memory based on said configuration of said memory controller and without performing a full address comparison, and
    wherein said storing said first data is performed independently of said request.

11. The method of claim 10 further comprising:
    accessing said second data from the first memory.

12. The method of claim 10, wherein said second data comprises a portion of a reference data block of the reference frame, and wherein said determining further comprises determining whether a first vertical location range associated with the reference data block is within a second vertical location range associated with said first data stored in the first memory.

13. The method of claim 12, wherein said determining further comprises accessing configuration bits, using a memory controller, to determine the second vertical location range.

14. The method of claim 10, wherein said second data comprises a portion of a reference data block of the reference frame, and wherein said determining further comprises comparing a spatial location of the reference data block with a spatial location of said first data to determine whether the reference data block resides in the first memory.

15. The method of claim 10, wherein said second data comprises a portion of a reference data block of the reference frame, and wherein said determining further comprises comparing a spatial location of each of at least two chunks of the reference data block with a spatial location of said first data to determine whether each of the chunks of the reference data block resides in the first memory.

16. The method of claim 15, wherein said determining further comprises determining whether said second data is stored in said first memory using a memory controller, and further comprising:
    configuring, contemporaneously with said storing said first data, the memory controller with configuration data, wherein said configuration data is associated with a spatial location of said first data.

17. The method of claim 16, wherein the reference frame includes M lines, wherein the first data is an N-line slice of the reference frame, and wherein N is less than M.

18. The method of claim 17, wherein said reference data block comprises data from L lines of the reference frame, wherein L is at most 16, and wherein N is equal to 48.

19. The method of claim 10, wherein said second data comprises a portion of a reference data block of the reference frame, wherein said reference frame includes M lines, wherein said first data comprises an N-line slice of the reference frame, and wherein N is less than M.

20. The method of claim 19, wherein said reference data block comprises data from L lines of the reference frame, wherein L is at most 16, and wherein N is equal to 48.

21. A method of video processing, said method comprising:
- storing, in a first memory, first data associated with a reference frame;
- responsive to said storing, updating a configuration of a memory controller performing said storing;
- accessing a request for second data associated with the reference frame; and
- responsive to the request, determining whether said second data is stored in the first memory based on said configuration of said memory controller and without performing a dynamic address manipulation, and
- wherein said storing said first data is performed independently of said request.

22. The method of claim 21 further comprising:
accessing said second data from the first memory.

23. The method of claim 21, wherein said second data comprises a portion of a reference data block of the reference frame, and wherein said determining further comprises determining whether a first vertical location range associated with the reference data block is within a second vertical location range associated with said first data stored in the first memory.

24. The method of claim 23, wherein said determining further comprises accessing configuration bits, using a memory controller, to determine the second vertical location range.

25. The method of claim 21, wherein said second data comprises a portion of a reference data block of the reference frame, and wherein said determining further comprises comparing a spatial location of the reference data block with a spatial location of said first data to determine whether the reference data block resides in the first memory.

26. The method of claim 21, wherein said second data comprises a portion of a reference data block of the reference frame, and wherein said determining further comprises comparing a spatial location of each of at least two chunks of the reference data block with a spatial location of said first data to determine whether each of the chunks of the reference data block resides in the first memory.

27. The method of claim 26, wherein said determining further comprises determining whether said second data is stored in said first memory using a memory controller, and further comprising:
- configuring, contemporaneously with said storing said first data, the memory controller with configuration data, wherein said configuration data is associated with a spatial location of said first data.

28. The method of claim 27, wherein the reference frame includes M lines, wherein the first data is an N-line slice of the reference frame, and wherein N is less than M.

29. The method of claim 28, wherein said reference data block comprises data from L lines of the reference frame, wherein L is at most 16, and wherein N is equal to 48.

30. The method of claim 21, wherein said second data comprises a portion of a reference data block of the reference frame, wherein said reference frame includes M lines, wherein said first data comprises an N-line slice of the reference frame, and wherein N is less than M.

31. The method of claim 30, wherein said reference data block comprises data from L lines of the reference frame, wherein L is at most 16, and wherein N is equal to 48.

32. A video processing system, said system comprising:
- an integrated circuit implementing a memory controller and a first memory coupled to the memory controller;
- a second memory configured to store at least one reference frame of video data; and
- a video processor coupled to the memory controller, and wherein the memory controller is configured to store first data associated with the reference frame in the first memory, and wherein the memory controller is further configured to, responsive to a request from the video processor for second data associated with the reference frame, determine whether the second data is stored in the first memory based on a configuration of said memory controller, and
- wherein said memory controller is further operable to store said first data independently of said request.

33. The system of claim 32, wherein the memory controller is further configured to read, if said second data is stored in said first memory, said second data from said first memory, and wherein said memory controller is further configured to read, if said second data is not stored in said first memory, said second data from said second memory.

34. The system of claim 32, wherein said second data comprises a portion of a reference data block of the reference frame.

35. The system of claim 32, wherein the reference frame is an M-line reference frame, wherein the first data comprises a plurality of predetermined N-line subsets of the reference frame, wherein M is greater than N, and wherein each of the plurality of predetermined N-line subsets includes data associated with processing of third data by the video processor, and wherein each of the plurality of predetermined N-line subsets remains stored in the first memory during processing in the video processor of one said subsequence of the sequence of current blocks.

36. A video processing system comprising:
- an integrated circuit implementing a memory controller and a first memory coupled to the memory controller;
- a second memory configured to store at least one reference frame of video data; and
- a video processor coupled to the memory controller, and wherein the memory controller is configured to determine first data associated with said reference frame, wherein said first data is further associated with processing of second data by said video processor, wherein said memory controller is further operable to store said first data in the first memory, wherein the memory controller is further operable to access a request for third data associated with said reference frame, and wherein said memory controller is further operable to, responsive to the request, determine whether said third data is stored in the first memory based on a configuration of said memory controller, and
- wherein said memory controller is further operable to store said first data independently of said request.

37. The system of claim 36, wherein the memory controller is further operable to:
- if said third data is stored in said first memory, access said third data from the first memory; and
- if said third data is not stored in said first memory, access said third data from a second memory, wherein said second memory is external to said integrated circuit.

38. The system of claim 36, wherein the third data comprises a portion of a reference data block of the reference frame.

39. The system of claim 36, wherein the reference frame is an M-line reference frame, wherein the first data comprises a plurality of predetermined N-line subsets of the M-line reference frame, wherein M is greater than N, wherein each of the plurality of predetermined N-line subsets includes data associated with processing of fourth data, and wherein each of the plurality of predetermined N-line subsets remains stored in the first memory during processing of said fourth data.

40. The system of claim 36, wherein said memory controller is further operable to determine said first data based upon information selected from a group consisting of: a probability associated with requiring said first data for processing of said second data; and a spatial relationship between said first data and said second data.

41. A video processing system, said system comprising:
an integrated circuit implementing a memory controller and a first memory coupled to the memory controller;
a second memory configured to store at least one reference frame of video data; and
a video processor coupled to the memory controller, and wherein the memory controller is configured to store first data associated with the reference frame in the first memory, and wherein the memory controller is further configured to, responsive to a request for second data associated with the reference frame, determine whether the second data is stored in the first memory based on a configuration of said memory controller and without performing a full address comparison, and
wherein said memory controller is further operable to store said first data independently of said request.

42. The system of claim 41, wherein the memory controller is further configured to access said second data from the first memory.

43. The system of claim 41, wherein said second data comprises a portion of a reference data block of the reference frame, and wherein the memory controller is further configured to determine whether a first vertical location range associated with the reference data block is within a second vertical location range associated with said first data stored in the first memory.

44. The system of claim 43, wherein the memory controller includes configuration registers, and wherein the memory controller is further operable to access configuration bits of the configuration registers to determine the second vertical location range.

45. The system of claim 41, wherein said second data comprises a portion of a reference data block of the reference frame, and wherein the memory controller is further configured to compare a spatial location of the reference data block with a spatial location of said first data to determine whether the reference data block resides in the first memory.

46. The system of claim 41, wherein said second data comprises a portion of a reference data block of the reference frame, and wherein the memory controller is further configured to compare a spatial location of each of at least two chunks of the reference data block with a spatial location of said first data to determine whether each of the chunks of the reference data block resides in the first memory.

47. A video processing system comprising:
an integrated circuit implementing a memory controller and a first memory coupled to the memory controller;
a second memory configured to store at least one reference frame of video data; and
a video processor coupled to the memory controller, and wherein the memory controller is configured to store first data associated with the reference frame in the first memory, and wherein the memory controller is further configured to, responsive to a request for second data associated with the reference frame, determine whether the second data is stored in the first memory based on a configuration of said memory controller and without performing a dynamic address manipulation, and
wherein said memory controller is further operable to store said first data independently of said request.

48. The system of claim 47, wherein the memory controller is further configured to access said second data from the first memory.

49. The system of claim 47, wherein said second data comprises a portion of a reference data block of the reference frame, and wherein the memory controller is further configured to determine whether a first vertical location range associated with the reference data block is within a second vertical location range associated with said first data stored in the first memory.

50. The system of claim 49, wherein the memory controller includes configuration registers, and wherein the memory controller is further operable to access configuration bits of the configuration registers to determine the second vertical location range.

51. The system of claim 47, wherein said second data comprises a portion of a reference data block of the reference frame, and wherein the memory controller is further configured to compare a spatial location of the reference data block with a spatial location of said first data to determine whether the reference data block resides in the first memory.

52. The system of claim 47, wherein said second data comprises a portion of a reference data block of the reference frame, and wherein the memory controller is further configured to compare a spatial location of each of at least two chunks of the reference data block with a spatial location of said first data to determine whether each of the chunks of the reference data block resides in the first memory.

53. An integrated circuit comprising:
a first memory; and
a memory controller coupled to the first memory,
wherein the memory controller is configured to store first data associated with the reference frame in the first memory, and wherein the memory controller is further configured to, responsive to a request for second data associated with the reference frame, determine whether the second data is stored in the first memory based on a configuration of said memory controller, and
wherein said memory controller is further operable to store said first data independently of said request.

54. The integrated circuit of claim 53, wherein the memory controller is further operable to:
if said second data is stored in said first memory, access said second data from the first memory; and
if said second data is not stored in said first memory, access said second data from a second memory, wherein said second memory is external to said integrated circuit.

55. The integrated circuit of claim 53, wherein said second data comprises a portion of a reference data block of the reference frame.

56. The integrated circuit of claim 53, wherein the memory controller is further configured to determine said first data based upon information selected from a group consisting of: a probability associated with requiring said first data for processing of third data; and a spatial relationship between said first data and said third data.

57. The integrated circuit of claim 53, wherein the memory controller is further operable to determine whether the second data is stored in the first memory without performing a full address comparison.

58. The integrated circuit of claim 53, wherein said second data comprises a portion of a reference data block of the reference frame, and wherein the memory controller is further configured to determine whether a first vertical location range associated with the reference data block is within a second vertical location range associated with said first data stored in the first memory.

59. The integrated circuit of claim 58, wherein the memory controller includes configuration registers, and wherein the memory controller is further operable to access configuration bits of the configuration registers to determine the second vertical location range.

60. The integrated circuit of claim 53, wherein said second data comprises a portion of a reference data block of the reference frame, and wherein the memory controller is further configured to compare a spatial location of the reference data block with a spatial location first data to determine whether the reference data block resides in the first memory.

61. The integrated circuit of claim 53, wherein said second data comprises a portion of a reference data block of the reference frame, and wherein the memory controller is further configured to compare a spatial location of each of at least two chunks of the reference data block with a spatial location of said first data to determine whether each of the chunks of the reference data block resides in the first memory.

62. The integrated circuit of claim 53, wherein the memory controller is further operable to determine whether the second data is stored in the first memory without performing a dynamic address manipulation.

\* \* \* \* \*